(12) United States Patent
Kurokawa et al.

(10) Patent No.: US 9,055,437 B2
(45) Date of Patent: Jun. 9, 2015

(54) COMMUNICATION SYSTEM, FEMTOCELL BASE STATION, AUTHENTICATION APPARATUS, COMMUNICATION METHOD, AND RECORDING MEDIUM

(75) Inventors: Osamu Kurokawa, Tokyo (JP); Kazuki Eguchi, Tokyo (JP); Koki Hayashi, Tokyo (JP); Yuichiro Kameoka, Tokyo (JP); Yasuhiro Watanabe, Tokyo (JP); Hiroaki Akiyama, Tokyo (JP); Takayuki Kido, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/124,679

(22) PCT Filed: Dec. 24, 2009

(86) PCT No.: PCT/JP2009/071394
§ 371 (c)(1),
(2), (4) Date: Jul. 21, 2011

(87) PCT Pub. No.: WO2010/074122
PCT Pub. Date: Jul. 1, 2010

(65) Prior Publication Data
US 2011/0268277 A1    Nov. 3, 2011

(30) Foreign Application Priority Data
Dec. 26, 2008  (JP) ................................. 2008-333622

(51) Int. Cl.
*H04L 29/06*     (2006.01)
*H04L 9/32*      (2006.01)
(Continued)

(52) U.S. Cl.
CPC ............. *H04W 12/06* (2013.01); *H04L 9/3242* (2013.01); *H04L 9/3271* (2013.01); *H04L 2209/42* (2013.01); *H04L 2209/80* (2013.01); *H04W 84/045* (2013.01); *H04L 65/1026* (2013.01)

(58) Field of Classification Search
None
See application file for complete search history.

(56) References Cited

U.S. PATENT DOCUMENTS 7,995,994 B2 * 8/2011 Khetawat et al. ............. 455/410
8,036,664 B2 * 10/2011 Khetawat et al. ............. 455/436
(Continued)

FOREIGN PATENT DOCUMENTS

CN          1708163 A     12/2005
CN         101064606 A    10/2007
(Continued)

OTHER PUBLICATIONS

International Search Report for PCT/JP2009/071394 mailed Feb. 2, 2010.

(Continued)

*Primary Examiner* — Christopher Revak
(74) *Attorney, Agent, or Firm* — Sughrue Mion, PLLC

(57) ABSTRACT

A communication system for solving a problem, in which secure communications security cannot be ensured in communications between a femtocell base station and UE, is provided. The communication system includes UE (User Equipment) and an HLR (Home Location Register) used in an IMS (IP Multimedia subsystem) network and a femtocell base station (Femto AP) that constructs a predetermined communication area. The femtocell base station exists between the UE and the HLR, acquires a concealment key corresponding to the UE from the HLR during authentication of the UE, and executes a concealment process to conceal the identity of the UE based on the concealment key.

13 Claims, 6 Drawing Sheets

(51) Int. Cl.
*H04W 12/06* (2009.01)
*H04W 84/04* (2009.01)

(56) References Cited

U.S. PATENT DOCUMENTS

| | | | | |
|---|---|---|---|---|
| 8,073,428 | B2* | 12/2011 | Khetawat et al. | 455/411 |
| 8,150,397 | B2* | 4/2012 | Khetawat et al. | 455/436 |
| 8,204,502 | B2* | 6/2012 | Khetawat et al. | 455/436 |
| 8,224,921 | B2* | 7/2012 | Morgan et al. | 709/213 |
| 8,230,035 | B2* | 7/2012 | Morgan et al. | 709/213 |
| 8,428,554 | B2* | 4/2013 | Morgan et al. | 455/410 |
| 8,457,597 | B2* | 6/2013 | Morgan et al. | 455/410 |
| 8,483,695 | B2* | 7/2013 | Nakahara | 455/450 |
| 2008/0076392 | A1 | 3/2008 | Khetawat et al. | |
| 2009/0067417 | A1* | 3/2009 | Kalavade et al. | 370/356 |
| 2009/0288145 | A1* | 11/2009 | Huber et al. | 726/3 |
| 2010/0015948 | A1* | 1/2010 | Nagano | 455/410 |
| 2010/0081425 | A1* | 4/2010 | Miyazaki et al. | 455/422.1 |
| 2010/0122338 | A1* | 5/2010 | Kataoka et al. | 726/12 |
| 2011/0123028 | A1* | 5/2011 | Karabinis | 380/270 |
| 2011/0183678 | A1* | 7/2011 | Kerpez et al. | 455/450 |
| 2011/0201311 | A1* | 8/2011 | Lee et al. | 455/411 |
| 2012/0026865 | A1* | 2/2012 | Fan et al. | 370/225 |
| 2012/0028608 | A1* | 2/2012 | Su et al. | 455/411 |
| 2013/0122911 | A1* | 5/2013 | Zdarsky et al. | 455/438 |
| 2013/0130691 | A1* | 5/2013 | Zhu et al. | 455/436 |

FOREIGN PATENT DOCUMENTS

| | | | |
|---|---|---|---|
| EP | 1 865 656 A1 | 12/2007 | |
| JP | 2006121180 A | 5/2006 | |
| JP | 2007-228383 A | 9/2007 | |
| JP | 2008219436 A | 9/2008 | |
| JP | 2008228250 A | 9/2008 | |
| JP | 2009105739 A | 5/2009 | |
| JP | 2011-501899 A | 1/2011 | |
| WO | 2007/015075 A1 | 2/2007 | |

OTHER PUBLICATIONS

3GPP TS 33.234 V8.0.0, Technical Specification Group Service and System Aspects; 3G Security; Wireless Local Area Network (WLAN) interworking security (Release 8), Dec. 2007.

3GPP TS 33.102 V8.0.0, Technical Specification Group Services and System Aspects; 3G Security; Security architecture (Release 8), Jun. 2008.

J. Arkko et al., "Extensible Authentication Protocol Method for 3rd Generation Authentication and Key Agreement (EAP-AKA)", Network Working Group, RFC 4187, Jan. 2006.

Japanese Office Action for JP Application No. 2013-105882 mailed on Jan. 14, 2014 with Partial English Translation.

Chinese Office Action for CN Application No. 200980152923.6 issued on Aug. 19, 2013 with English Translation.

The extended EP search report for EP Application No. 09 834 920.2 dated on Oct. 8, 2013.

"3rd Generation Partnership Project;Technical Specification Group Service and System Aspects;3G Security;Wireless Local Area Network (WLAN) interworking security (Release 8)", 3GP TS 33.23, Mar. 1, 2008, pp. 1-101, XP00376783, p. 28-32, V8.1.0, Mobil Competence Center, France. Cited in EP Search Report (Non-Patent Literature No. 2).

* cited by examiner

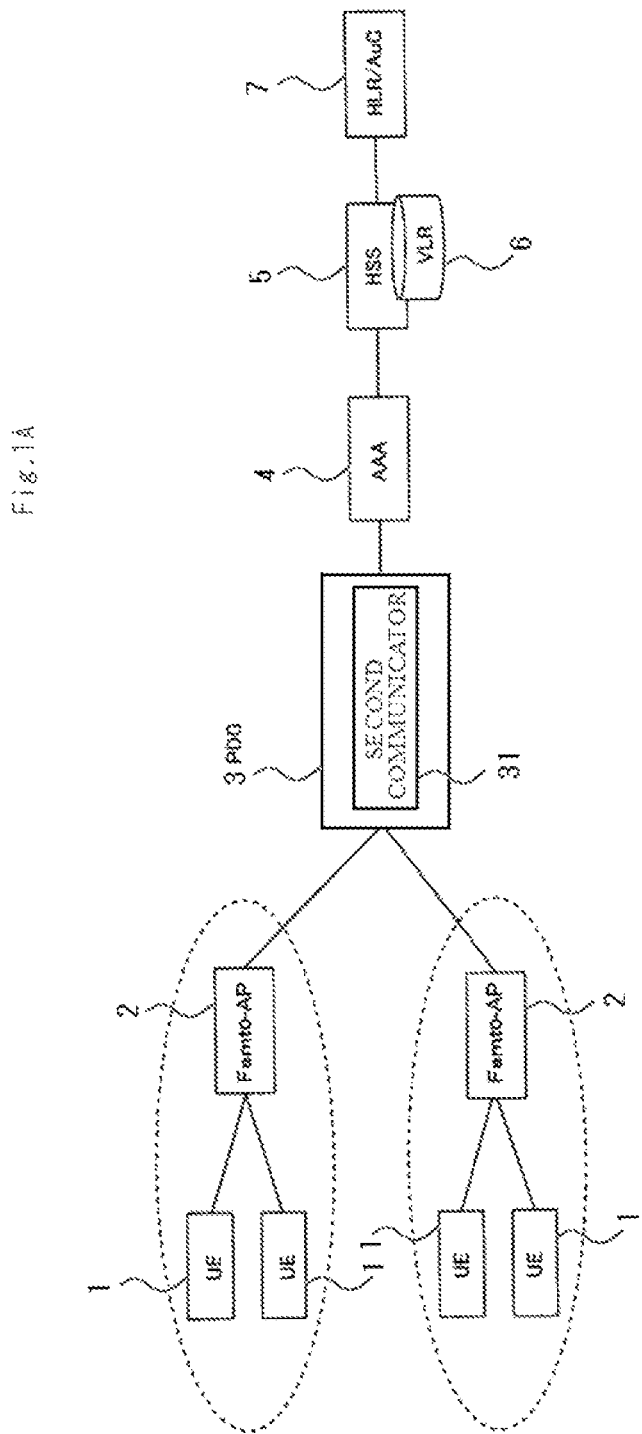

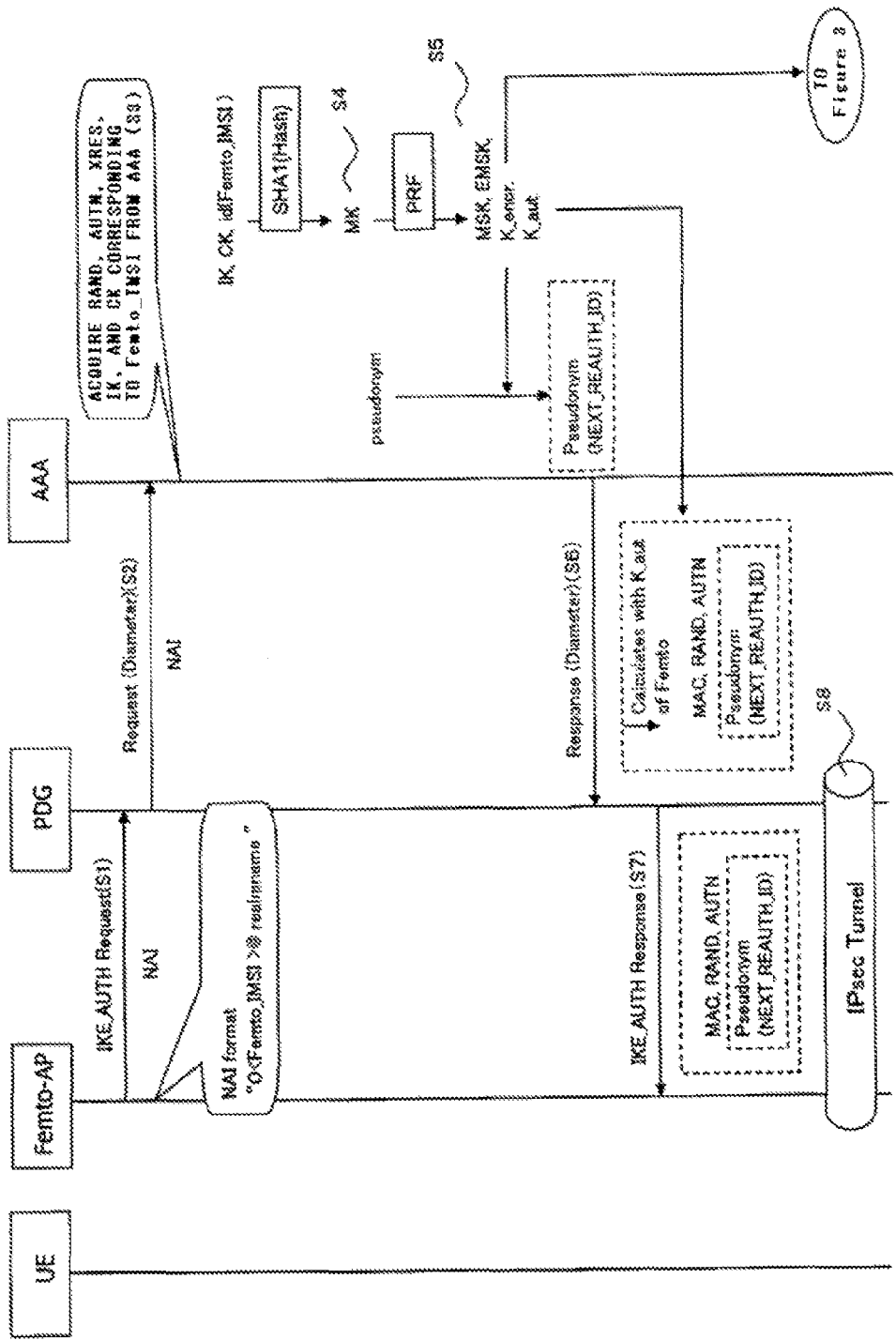

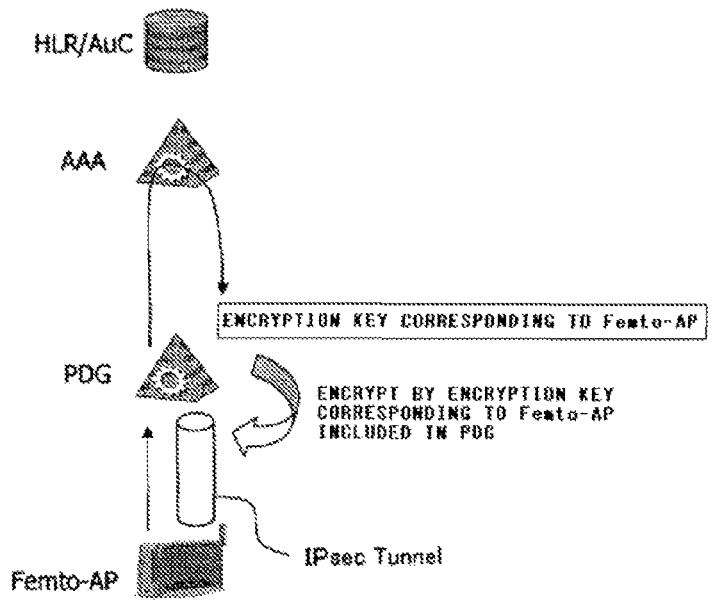
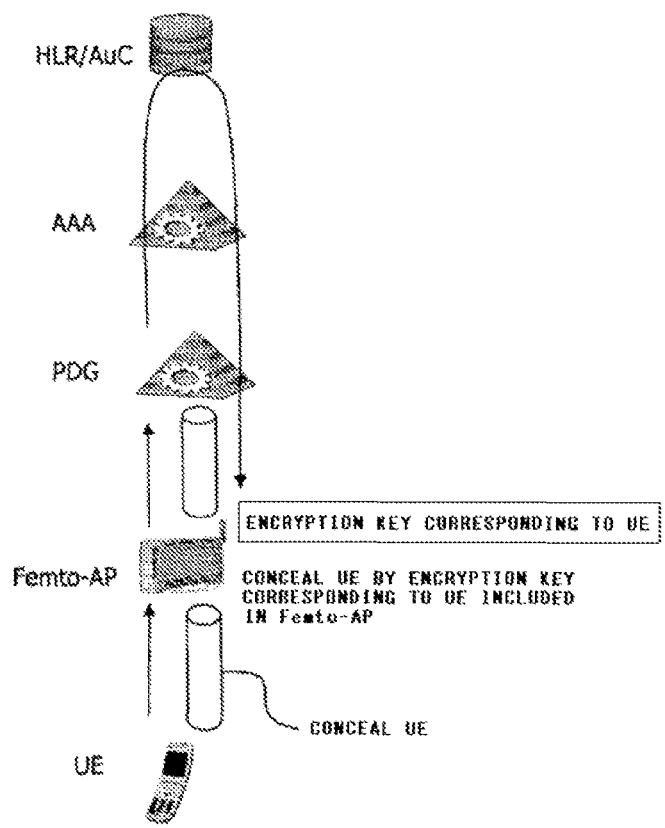

COMMUNICATION SYSTEM, FEMTOCELL BASE STATION, AUTHENTICATION APPARATUS, COMMUNICATION METHOD, AND RECORDING MEDIUM

This application is the National Phase of PCT/JP2009/071394, filed Dec. 24, 2009, which claims the benefit of Japanese Patent Application No. 2008-333622 filed on Dec. 26, 2008, the entire disclosure of which is incorporated herein by reference.

TECHNICAL FIELD

The present invention relates to a communication system, a femtocell base station, an authentication apparatus, a communication method, and a recording medium for communication through a femtocell base station.

BACKGROUND ART

In recent years, a communication system using a femtocell base station has been developed to improve communication quality.

The femtocell base station is a small wireless base station covering a narrow communication area with a radius of about several dozen meters, and installation of the femtocell base station indoors, such as in house or in office, can improve communication quality indoors. Therefore, installation of the femtocell base station allows communication in an area in which an existing macrocell base station cannot communicate. Furthermore, since new installation of a macrocell base station is not necessary, the cost for installing the macrocell base station can be reduced.

Currently, an "existing 3G network", a communication network for communication through an existing macrocell base station, is used as a communication network (communication system) for connecting a user and a communication provider. If a communication infrastructure different from a communication infrastructure used in an existing 3G network is installed in order to install a femtocell base station, various burdens, such as high cost, are imposed on the user and the communication provider. Therefore, it is preferable to use a communication infrastructure used in an existing 3G network to develop a communication system in which a femtocell base station can be used.

An example of a technique of existing 3G network includes a technique related to 3GPP standardization described in Non-Patent Document 1.

The technique related to 3GPP standardization described in Non-Patent Document 1 illustrates a communication system including WLAN UE and a macrocell base station. However, in Non-Patent Document 1, a communication system installed with a femtocell base station is not considered. Therefore, even if a femtocell base station is used as WLAN UE, communication between the femtocell base station and the UE under control of the femtocell base station cannot be performed using the technique related to 3GPP standardization.

Therefore, in the communication between the femtocell base station and the UE, the secure communication that is ensured in the technique related to 3GPP standardization cannot be ensured.

An example of a related art concerning assurance of the security of communication includes a technique for connecting a non-IMS/MMD-compliant terminal including a SIP function with an IMS/MMD network (see Patent Document 1).

There is also a technique for allowing a public mobile terminal to use both the public mobile communication service and the extension service while protecting a SIP message using IPsec.

Furthermore, there is a technique of 3GPP standardization related to an authentication system of network security (see Non-Patent Document 2).

RELATED ART DOCUMENTS

Patent Documents

Patent Document 1: Japanese Patent Laid-Open No. 2008-219436
Patent Document 2: Japanese Patent Laid-Open No. 2008-228250

Non-Patent Documents

Non-Patent Document 1: 3GPP TS 33.234 V8.0.0 (2007-12)
Non-Patent Document 2: 3GPP TS 33.102 V8.0.0 (2008-06)

SUMMARY OF THE INVENTION

Problems to be Solved by the Invention

However, in Documents, there is no description related to a communication system installed with a femtocell base, station, and there is no description concerning the assurance of the security of communication between the femtocell base station and the UE. Furthermore, in Documents, there is no description nor suggestion concerning the necessity to ensure the security of communication between the femtocell base station and the UE.

Therefore, in Documents, there is a problem in which secure communication between the femtocell base station and the UE cannot be ensured.

An object of the present invention is to provide a communication system, a femtocell base station, an authentication apparatus, a communication method, and a program for solving the problem in which the communication security cannot be ensured in communications between the femtocell base station and the UE.

Means for Solving the Problems

A communication system according to the present invention comprises UE (User Equipment) and an HLR (Home Location Register) used in an IMS (IP Multimedia subsystem) network and a femtocell base station that constructs a predetermined communication area. The femtocell base station exists between the UE and the HLR and uses a concealment key corresponding to the UE acquired from the HLR during authentication of the UE to execute a concealment process for concealing the identity of the UE.

A femtocell base station according to the present invention constructs a predetermined communication area, wherein the femtocell base station uses a concealment key corresponding to UE acquired from an HLR (Home Location Register) during authentication of the UE (User Equipment) and execute a concealment process for concealing the identity of the UE.

An authentication apparatus according to the present invention authenticates UE, wherein the authentication apparatus acquires a concealment key corresponding to the UE from an HLR (Home Location Register) during authentication of the UE and transmits a message including the acquired concealment key to a femtocell base station.

A first communication method according to the present invention is a communication method by a communication system comprising: UE (User Equipment) and an HLR (Home Location Register) used in an IMS (IP Multimedia subsystem) network; and a femtocell base station that constructs a predetermined communication area, the femtocell base station existing between the UE and the HLR, wherein the femtocell base station acquires a concealment key corresponding to the UE from the HLR during authentication of the UE and executes a concealment process to conceal the identity of the UE based on the concealment key.

A second communication method according to the present invention is a communication method by a femtocell base station that constructs a predetermined communication area, wherein a concealment key corresponding to UE is acquired from the HLR during authentication of the UE, and a concealment process for concealing the identity of the UE is executed based on the concealment key.

A third communication method according to the present invention is a communication method by an authentication apparatus that authenticates UE, wherein a concealment key corresponding to the UE is acquired from an HLR (Home Location Register) during authentication of the UE, and a message including the acquired concealment key is transmitted to a femtocell base station.

A first recording medium according to the present invention causes a femtocell base station that constructs a predetermined communication area to execute a process of acquiring a concealment key corresponding to UE from the HLR during authentication of the UE and executing a concealment process to conceal the identity of the UE based on the concealment key.

A second recording medium according to the present invention causes an authentication apparatus that authenticates UE to execute a process of acquiring a concealment key corresponding to the UE from an HLR (Home Location Register) during authentication of the UE and executing a process of transmitting a message including the acquired concealment key to a femtocell base station.

Advantage of the Invention

According to the present invention, secure of communication between a femtocell base station and UE can be ensured.

BRIEF DESCRIPTION OF THE DRAWINGS

FIG. 1A is a block diagram showing a communication system of an exemplary embodiment;
FIG. 2 is a sequence diagram for explaining an operation of Femto AP Authentication;
FIG. 6A is an explanatory diagram for explaining an example of an operation explained in FIG. 2;
and
FIG. 6B is an explanatory diagram for explaining an example of an operation explained in FIG. 3.

MODE FOR CARRYING OUT THE INVENTION

Hereinafter, an exemplary embodiment will be described with reference to the drawings.
<Summary of Communication System>
First, a summary of a communication system of the exemplary embodiment will be described.

The communication system in the exemplary embodiment includes UE (User Equipment) and HLR (Home Location Register) used in an IMS (IP Multimedia subsystem) network and femtocell base station (Femto AP) that constructs a predetermined communication area. A femtocell base station (Femto AP) exists between UE and HLR.

The femtocell base station (Femto AP) of the exemplary embodiment is characterized by acquiring a concealment key corresponding to UE acquired from HLR during authentication of UE and executing a concealment process to conceal the identity of the UE based on the concealment key. This can ensure secure communication between femtocell base station (Femto AP) and UE.
<System Configuration Example of Communication System>

FIG. 1A is a block diagram showing a configuration of the communication system of the exemplary embodiment. In FIG. 1A, the communication system of the exemplary embodiment includes UE (User Equipment) 1, Femto AP (Access Point) 2, PDG (Packet Data Gateway) 3, AAA (Authentication Authorization Accounting) 4, HSS (Home Subscriber Server) 5, VLR (Visitor Location Register) 6, and HLR/AuC (Home Location Register/Authentication Centre) 7.

UE 1 is a communication terminal device such as a cell phone.

Femto AP 2 may also be called a femtocell base station. Femto AP 2 is a small wireless base station that covers a narrow communication area with a radius of about several dozen meters.

Figure 1B:
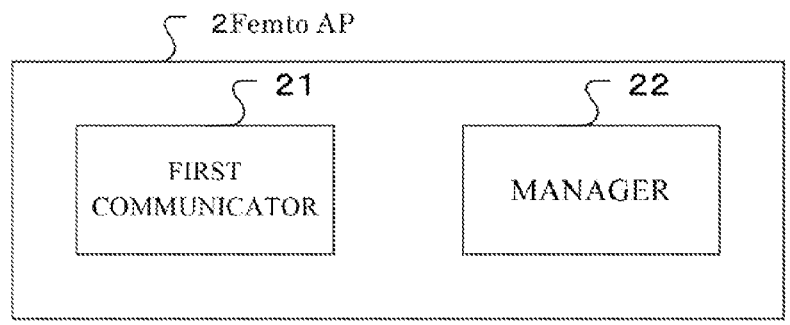
FIG. 1B is a block diagram showing a configuration example of Femto AP.

FIG. 1B is a block diagram showing a configuration example of Femto AP 2. FIG. 1B, Femto AP 2 includes first communicator 21 and manager 22.

First communicator 21 transmits Request including IMSI (UE_IMSI) as Identity of UE 1 under the control of Femto AP 2 and IMSI (Femto_IMSI) as Identify of Femto AP 2 to acquire a concealment key for concealing the identity of UE 1. This Request is a request for acquiring a concealment key and is an example of a first message.

Manager 22 executes a concealment process to conceal the identity of UE 1 based on the concealment key.

FIG. 1A will be described again. PDG 3 may also be called a relay apparatus. PDG 3 relays communication between Femto AP 2 and AAA 4. PDG 3 includes second communicator 31.

When Request is received from Femto AP 2, second communicator 31 transmits Request to AAA 4. When Response including the concealment key corresponding to IMSI of UE is received from AAA 4, second communicator 31 transmits Response to Femto AP 2.

AAA 4 may also be called an authentication apparatus. AAA 4 executes an authentication process between UE 1 and a network.

Figure 1C:
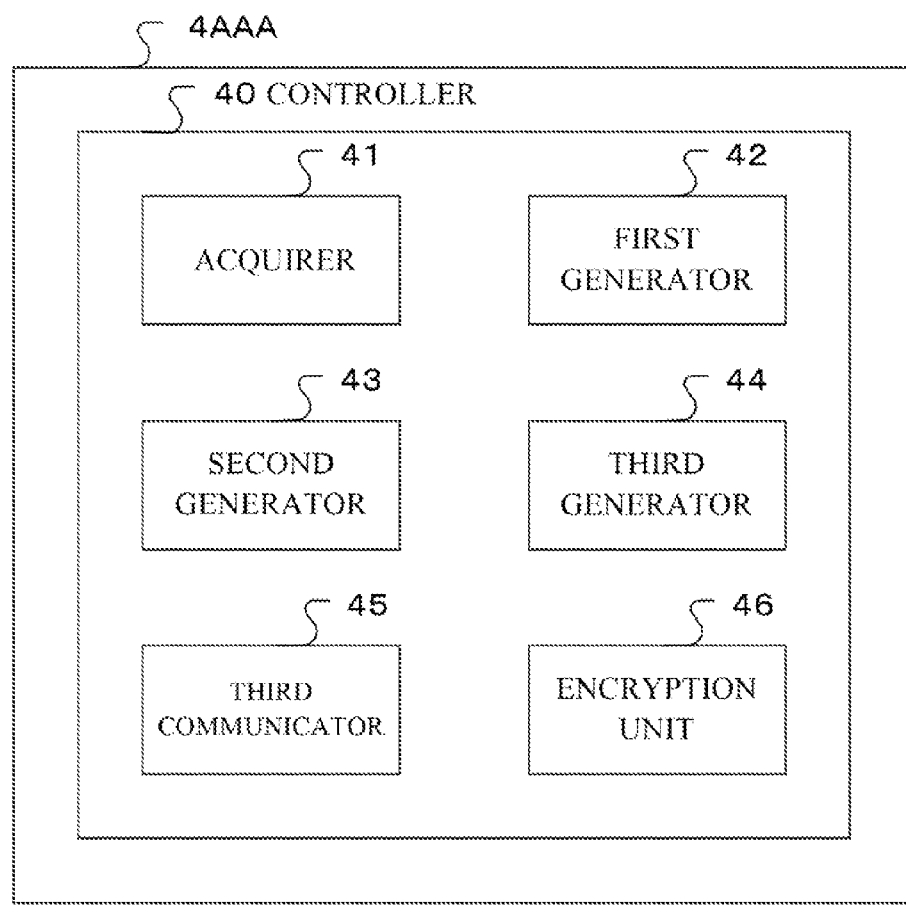
FIG. 1C is a block diagram showing a configuration example of AAA.

FIG. 1C is a block diagram showing a configuration example of AAA 4. AAA 4 includes controller 40. When Request is received from PDG 3, controller 40 acquires a concealment key corresponding to IMSI of UE 1 in Request from HLR/Auc 7 and transmits Response including the acquired concealment key to PDG 3. More specifically, controller 40 transmits Response including the concealment key corresponding to IMSI of UE 1 in Request as an attribute.

Controller 40 includes acquirer 41, first generator 42, second generator 43, third generator 44, third communicator 45, and encryption unit 46.

Acquirer 41 acquires, RAND (Random challenge), AUTN (Authentication Token), XRES (Expected RESponse), IK (Integrity Key), and CK (Cipher Key) corresponding to IMSI of UE 1 from HLR/AUC 7 as a concealment key.

First generator 42 generates MK (Master Key) based on IK and CK acquired by acquirer 41 and IMSI of UE 1 in Request.

Second generator 43 generates MSK (Master Session Key), EMSK (Extended Master Session Key), as well as K_encr and K_aut based on MK generated by first generator 42.

Third generator 44 generates MAC (Message Authentication Code) based on K_aut generated by second generator 43.

Third communicator 45 transmits Response including MAC generated by third generator 44, RAND and AUTN acquired by acquirer 41, and CK and IK generated by first generator 42 as a concealment key.

Encryption unit 46 uses K_encr corresponding to Femto AP 2 generated during the authentication of Femto AP 2 to encrypt CK and IK. Third communicator 45 transmits Response including CK and IK encrypted in encryption unit 46.

FIG. 1A will be described again. HSS 5 is an apparatus that manages subscriber information of UE 1 used in IMS.

VLR 6 is an apparatus that stores the subscriber information of UE 1. HSS 5 acquires the subscriber information of UE from HLR/AuC 7 and stores the acquired subscriber information of UE 1 in VLR 6 to manage the information.

HLR/AuC 7 is an apparatus that manages the subscriber information of UE 1.

<Operation of Communication System>

Figure 3:
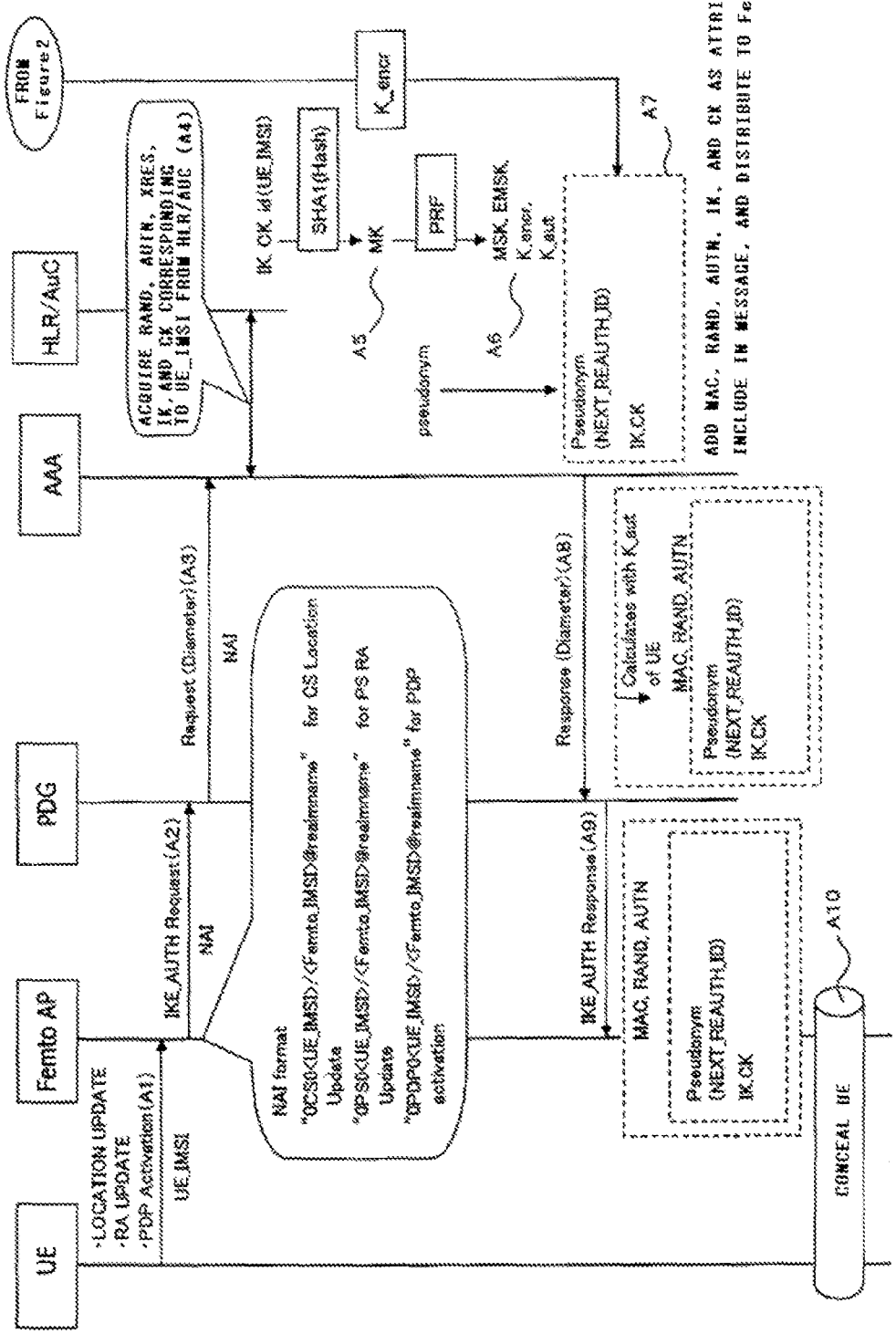
FIG. 3 is a sequence diagram for explaining an operation of UE Authentication.

Next, an operation of the communication system of the exemplary embodiment will be described in detail with reference to FIGS. 2 and 3. FIG. 2 is a sequence diagram for explaining an operation (Femto AP Authentication) for constructing an IPsec Tunnel between Femto AP 2 and PDG 3, and FIG. 3 is a sequence diagram for explaining an operation (UE Authentication) for executing a 3G concealment process for concealing the identity between Femto AP 2 and UE 1.

<Femto AP Authentication>

First, an operation of Femto AP Authentication will be described with reference to FIG. 2.

First communicator 21 of Femto AP 2 transmits an IKE_AUTH Request including IMSI (Femto_IMSI) of Femto AP 2 to PDG 3 (step S1). For example, first communicator 21 transmits an IKE_AUTH Request including NAI (Network Access Identifier) of 0<Femto_IMSI>@realmname. NAI is information for identifying access of network. "<Femto_IMSI>" is information for identifying Femto AP.

When an IKE_AUTH Request is received from Femto AP 2, second communicator 31 of PDG 3 transmits Request (Diameter) including NAI of 0<Femto_IMSI>@realmname to AAA 4 (step S2). The request (Diameter) is transmitted in a protocol called Diameter.

When the Request (Diameter) is received from PDG 3, acquirer 41 of AAA 4 acquires authentication vector values (RAND, AUTN, XRES, IK, and CK) corresponding to Femto_IMSI included in NAI in the Request (Diameter) from AAA 4 and manatzes the acquired authentication vector values in AAA 4 (step S3). AAA 4 holds in advance information indicating authentication vector values corresponding to Femto_IMSI for each Femto_IMSI, and acquirer 41 acquires authentication vector values corresponding to Femto_IMSI included in NAI from the information.

Authentication vector values RAND, AUTN, XRES, IK, and CK are information compliant with 3GPP. More specifically, RAND denotes Random challenge, AUTN denotes Authentication Token, XRES denotes Expected RESponse, IK denotes Integrity Key, and CK denotes Cipher Key.

First generator 42 of AAA 4 generates MK (Master Key) based on IK and CK acquired by acquirer 41 and Identity (Femto_IMSI) included in NAI (step S4). MK is generated by, for example, a method compliant with RFC 4187.

Second generator 43 of AAA 4 generates MSK (Master Session Key), EMSK (Extended Master Session Key), K_encr, and K_aut based on MK generated by first generator 42 (step S5). More specifically, second generator 43 inputs MK to PRF (Pseudo-Random number Function) to generate MSK, EMSK, K_encr, and K_aut.

K_encr is used during encryption, and K_aut is used during authentication. MSK, EMSK, K_encr, and K_aut are generated with a method compliant with RFC 4187.

Third generator 44 of AAA 4 generates MAC (Message Authentication Code) based on K_aut of Femto AP 2 generated by second generator 43.

Third communicator 45 of AAA 4 transmits MAC generated by third generator 44 and Response (Diameter) including RAND and AUTN acquired by acquirer 41 (step S6). Third communicator 45 adds RAND and AUTN acquired by acquirer 41 to an EAP payload of Response (Diameter) as an attribute and then transmits the Response (Diameter).

When the Response (Diameter) is received from AAA 4, second communicator 31 of PDG 3 transmits an IKE_AUTH Response including MAC, RAND, and AUTN in the Response (Diameter) to Femto AP 2 (step S7). First communicator 21 of Femto AP 2 receives the IKE_AUTH Response. As a result, Femto AP 2 can acquire a concealment key (MAC, RAND, and AUTN) corresponding to Femto AP.

Manager 22 of PDG 3 establishes IPsec Tunnel with Femto AP based on the concealment key in the IKE_AUTH Response received by first communicator 21 (step S8). IPsec Tunnel is established by a method compliant with 3GPP.

In this way, in the communication system of the exemplary embodiment, Femto AP 2 transmits the IMSI (Femto_IMSI) of Femto AP 2 to AAA 4. AAA 4 acquires authentication vector values (RAND, AUTN, XRES, IK, and CK) corresponding to Femto_IMSI and generates a concealment key (MAC, RAND, and AUTN) corresponding to Femto_IMSI based on the authentication vector values (RAND, AUTN, XRES, IK, and CK). AAA 4 then transmits the concealment key (MAC, RAND, and AUTN) corresponding to generated Femto_IMSI to Femto AP 2. As a result, IPsec Tunnel can be established between Femto AP 2 and PDG 3.

<UE Authentication>

Next, an operation of UE Authentication will be described with reference to FIG. 3. To register the location of a Request CS (Circuit Switching) service, UE 1 transmits a Location Update Request to Femto AP 2 as Request for authentication.

To register the location of a PS (Packet Switching) service, UE 1 transmits RA Update Request (Attach Request) to Femto AP 2 as Request for authentication. To perform PDP Activation, UE 1 transmits an Activate PDP Context Request to Femto AP 2 as a Request for authentication. In the following processing operation, a case in which UE 1 transmits a Location Update Request to Femto AP 2 will be described. The same operation as the following operation can be performed when UE 1 transmits an RA Update Request (Attached Request) or an Activate PDP Context Request.

First, UE 1 transmits Location Update Request including IMSI (UE_IMSI) of UE 1 to Femto AP 2 (step A1).

When a Location Update Request is received from UE 1, first communicator 21 of Femto AP 2 transmits an IKE_AUTH Request including UE_IMSI in the Location Update Request and the IMSI (Femto_IMSI) of Femto AP 2 to PDG 3 (step A2). Since first communicator 21 has received the Location Update Request, the IKE_AUTH Request including NAI of 0CS0<UE_IMSI>/<Femto_IMSI>@realmname is transmitted as IKE_AUTH Request. "0CS0" is information denoting location registration of CS service. "<UE_IMSI>" is information for identifying UE. "<Femto_IMSI>" is information for identifying Femto AP.

When an Activate PDP Context Request is received, First communicator 21 of Femto AP 2 transmits an IKE_AUTH Request including NAI of 0PDP0<UE_IMSI>/<Femto_IMSI>@realmname. "0PDP0" is information indicating PDP Activation.

When the IKE RUTH Request is received, second communicator 31 of PDG 3 transmits Request (Diameter) including the NAI of 0CS0<UE_IMSI>/<Femto_IMSI>@realmname to AAA 4 (step A3).

When the Request (Diameter) is received, acquirer 41 of AAA 4 acquires authentication vector values (RAND, AUTN, XRES, IK, and CK) corresponding to UE_IMSI included in NAI in Request (Diameter) from HLR/AuC and manages the acquired authentication vector values (step A4).

First generator 42 of AAA 4 generates MK (Master Key) based on IK and CK corresponding to UE_IMSI and Identity (UE_IMSI) in the Request (Diameter) acquired by acquirer 41 (step A5). MK can be generated using a method compliant with RFC 4187.

Second generator 43 of AAA 4 generates MSK (Master Session Key), EMSK (Extended Master Session Key), K_encr, and K_aut based on MK generated by first generator 42 (step A6). More specifically, second generator 43 inputs MK in PRF (Pseudo-Random number Function) to generate MSK (Master Session Key), EMSK (Extended Master Session Key), K_encr, and K_aut (step A6).

MSK, EMSK, K_encr, and K_aut are generated using, for example, a method compliant with RFC 4187.

Encryption unit 46 of AAA 4 encrypts IK and CK acquired by acquirer 41 (step A7). K_encr of Femto AP 2 is used for encryption. This is because since K_encr of UE 1 can only recognize AAA 4 and UE 1, if K_encr of UE 1 is used for encryption, Femto AP 2 cannot decode the concealment key corresponding to UE. Therefore, encryption unit 46 uses K_encr of Femto AP 2 to encrypt IK and CK so that Femto AP 2 can decode the concealment key of UE 1.

Third generator 44 of AAA 4 generates MAC (Message Authentication Code) based on K_aut of UE 1 generated by second generator 43. Third communicator 45 of AAA 4 adds RAND and AUTN acquired by acquirer 41, IK and CK encrypted by encryption unit 46, and MAC generated by second generator 43 to the EAP payload of Response (Diameter). Third communicator 45 transmits a Response (Diameter) to PDG 3 (step A8). This allows AAA 4 to distribute the Request (Diameter) including MAC, RAND, AUTN, IK, and CK as an attribute to Femto AP 2.

When the Response (Diameter) is received, second communicator 31 of PDG 3 transmits IKE_AUTH Response including MAC, RAND, AUTN, IK, and CK in the Response (Diameter) to Femto AP 2 (step A9). First communicator 21 of Femto AP 2 receives IKE_AUTH Response. As a result, Femto AP 2 acquires a concealment key (MAC, RAND, AUTN, IK, and CK) corresponding to UE 1.

Manager 22 of Femto AP 2 then executes a concealment process of UE 1 between UE 1 and Femto AP 2 (step A10). The concealment process of UE 1 is executed by a method compliant with 3GPP.

In this way, in the communication system of the exemplary embodiment, UE 1 transmits the IMSI (UE_IMSI) of UE 1 to Femto AP 2. Femto AP 2 transmits the IMSI (UE_IMSI) of UE 1 and IMSI (Femto_IMSI) of Femto AP 2 to AAA 4. AAA 4 acquires authentication vector values (RAND, AUTN, XRES, IK, and CK) corresponding to UE_IMSI and uses the authentication vector values (RAND, AUTN, XRES, IK, and CK) to generate MSK, EMSK, K_encr, K_aut, IK, and CK corresponding to UE_IMSI. AAA 4 also uses K_aut corresponding to UE_IMSI to generate MAC corresponding to UE_IMSI. AAA 4 then transmits a concealment key (MAC, RAND, AUTN, IK, and CK) corresponding to UE_IMSI to Femto AP 2.

This allows Femto AP 2 to hold an encryption key corresponding to UE, and a concealment process of UE 1 can be executed between Femto AP 2 and UE 1.

Figure 4:
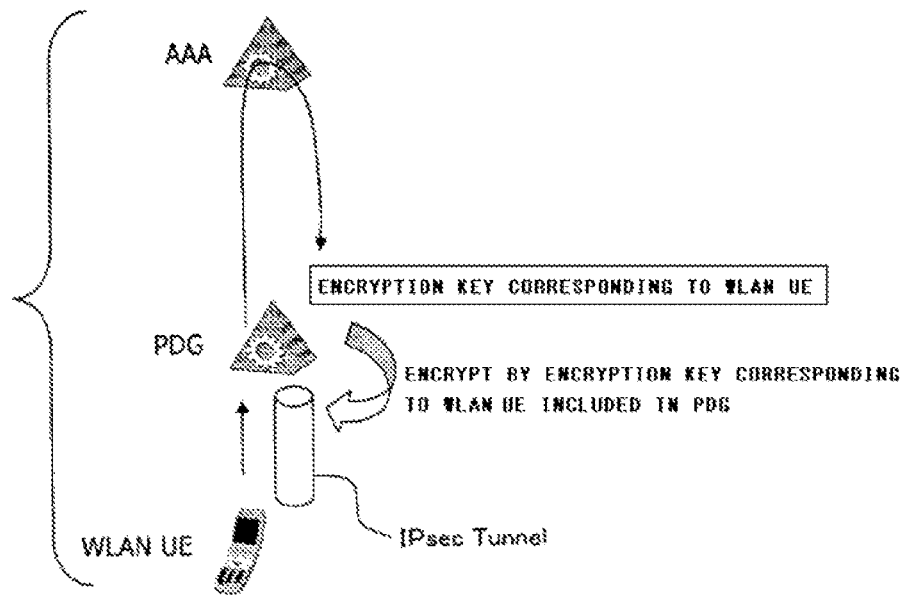
FIG. 4 is an explanatory diagram for explaining a method for constructing IPsec Tunnel between WLAN UE and PDG.

Non-Patent Document 1 discloses a method of constructing an IPsec Tunnel between WLAN UE and PDG. In this method, as shown in FIG. 4, PDG holds an encryption key corresponding to WLAN UE and can use the encryption key to construct the IPsec Tunnel between the UE and PDG.

Figure 5:
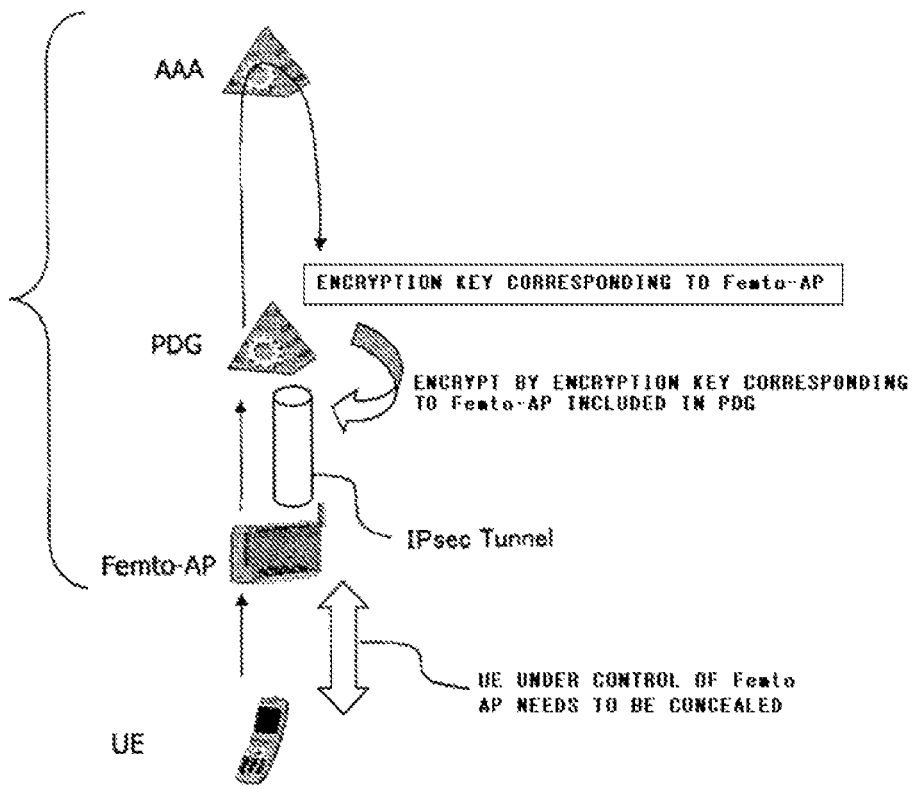
FIG. 5 is an explanatory diagram for explaining a problem when Femto AP is installed.

Assuming that Femto AP 2 is WLAN UE (see FIG. 4) disclosed in Non-Patent Document 1 and that a technique related to 3GPP standardization disclosed in Non-Patent Document is used, PDG 3 holds an encryption key corresponding to Femto AP 2 as shown in FIG. 5 and can use the encryption key to construct the IPsec Tunnel between Femto AP 2 and PDG 3.

In this case, as shown in FIG. 5, a 3G concealment process for concealing the identity of UE 1 is necessary because UE 1 exists under Femto AP 2. However, in a WLAN system, transfer of encryption key of 3G concealment process is not taken into consideration because there is no need to execute the 3G concealment process.

Therefore, as a result of various attempts for modifications and intensive studies to solve the problem, the present inventor has developed the technique as described in the exemplary embodiment.

Specifically, secure communication security between Femto AP 2 and PDG 3 is ensured by Femto Ap Authentication described with reference to FIG. 2. More specifically, as shown in FIG. 6A, PDG 3 holds an encryption key corresponding to Femto AP 2 and uses the encryption key to construct an IPsec Tunnel between Femto AP and PDG. This can ensure secure communications between Femto AP and PDG.

Secure communications between Femto AP and UE are ensured by UE Authentication described with reference to FIG. 3. More specifically, an encryption key corresponding to UE is distributed from AAA 4 to Femto AP 2, and as shown in FIG. 6B, Femto AP 2 holds an encryption key corresponding to UE and uses the encryption key to execute a UE concealment process between UE 1 and Femto AP 2. This can ensure secure communications between Femto AP 2 and UE 1.

In this way, the communication system installed with Femto AP 2 shown in FIG. 1 can also secure the communication security between Femto AP 2 and UE 1.

The exemplary embodiment is a preferred embodiment of the present invention. The present invention is not limited only to the exemplary embodiment, but can be carried out in a form applied with various changes without departing from the scope of the present invention.

For example, Non-Patent Documents 1 and 2 presented in the present specification are examples, and the communication system in the exemplary embodiment is independent from Version of 3GPP described in Non-Patent Documents 1 and 2.

Functions of the apparatuses including the communication system in the exemplary embodiment may be realized by hardware, software, or a composite configuration of hardware and software.

To realize the functions of the apparatuses using software, a program for realizing the functions may be recorded in a computer-readable recording medium, and a computer may read out and execute the program recorded in the recording medium.

The computer-readable recording medium denotes a recording medium such as a flexible disk, a magneto-optical disk, and a CD-ROM, or a recording apparatus such as a hard disk apparatus included in a computer system. The computer-readable recording medium further includes a thing (transmission medium or transmission wave) that dynamically holds a program for a short time, such as when the program is transmitted through the Internet, and a thing that holds a program for a certain period, such as a volatile memory in a computer that acts as a server when the program is transmitted through the Internet.

The communication system in the exemplary embodiment may not only execute the processes in series in accordance with the operations described in the exemplary embodiment, but the apparatuses may also execute the processes in parallel or individually in accordance with processing capacity, or on an as needed basis, of the apparatuses that execute the processes.

Although the present invention has been described with reference to the exemplary embodiment, the present invention is not limited to the exemplary embodiment. Various changes understandable by those skilled in the art can be made to the configurations and details of the present invention within the scope of the present invention.

INDUSTRIAL APPLICABILITY

The present invention can be applied to a service using a femtocell base station.

The invention claimed is:

1. A communication system comprising: UE (User Equipment) and an HLR (Home Location Register) used in an IMS (IP Multimedia subsystem) network; and a femtocell base station that constructs a predetermined communication area, wherein
said femtocell base station exists between said UE and said HLR, acquires a concealment key corresponding to said UE from said HLR during authentication of said UE, and executes a concealment process to conceal the identity of said UE based on said concealment key,
wherein said concealment key is used to conceal the identity of said UE just for communication between said UE and said femtocell base station,
wherein a controller of the system comprises:
an acquirer that acquires a RAND (Random challenge), an AUTN (Authentication Token), an XRES (Expected RESponse), an IK (Integrity Key), and a CK (Cipher Key) corresponding to an IMSI of said UE from said HLR as the concealment key;
a first generator that generates an MK (Master Key) based on the IK and the CK acquired by said acquirer and the IMSI of said UE in a first message;
a second generator that generates an MSK (Master Session Key), an EMSK (Extended Master Session Key), K_encr, and K_aut based on the MK generated by said first generator;
a third generator that generates a MAC (Message Authentication Code) based on the K_aut generated by said second generator; and
a third communicator that transmits a second message including the MAC generated by said third generator, the RAND and the AUTN acquired by said acquirer, and the CK and the IK generated by said first generator as the concealment key.

2. The communication system according to claim 1, further comprising:
an authentication apparatus that authenticates said UE; and
a relay apparatus that relays communication between the authentication apparatus and said femtocell base station, wherein
said femtocell base station comprises a first communicator that transmits the first message including the IMSI of said UE and an IMSI of said femtocell base station to the relay apparatus,
said relay apparatus comprises a second communicator that transmits the first message to the authentication apparatus when the first message is received from said femtocell base station and transmitting the second message including a concealment key corresponding to the IMSI of said UE to said femtocell base station when the second message is received from the authentication apparatus, and
said authentication apparatus comprises the controller that acquires a concealment key corresponding to said IMSI of said UE in the first message from said HLR when the first message is received from the relay apparatus and transmitting the second message including the acquired concealment key to the relay apparatus.

3. The communication system according to claim 2, wherein
said controller transmits the second message including the concealment key corresponding to said IMSI of said UE as an attribute to the relay apparatus.

4. The communication system according to claim 2, wherein
said third communicator transmits the second message including the MAC, the RAND, the AUTN, the CK, and the IK as an attribute.

5. The communication system according to claim 2, wherein
said controller uses an encryption key generated during authentication of said femtocell base station to encrypt the concealment key and transmits the second message including the encrypted concealment key to the relay apparatus.

6. The communication system according to claim 4, wherein
said controller further comprises encryption unit that encrypts the CK and the IK using a K_encr corresponding to said femtocell base station generated during authentication of said femtocell base station, and
said third communicator transmits the second message including the CK and the IK encrypted by said encryption unit.

7. A femtocell base station of a system that constructs a predetermined communication area, wherein
said femtocell base station acquires a concealment key corresponding to said UE from said HLR during authentication of said UE and executes a concealment process to conceal the identity of said UE based on the concealment key, wherein said concealment key is used to conceal the identity of said UE just for communication between said UE and said femtocell base station, wherein a controller of the system comprises:

an acquirer that acquires a RAND (Random challenge), an AUTN (Authentication Token), an XRES (Expected RESponse), an IK (Integrity Key), and a CK (Cipher Key) corresponding to an IMSI of said UE from said HLR as the concealment key;

a first generator that generates an MK (Master Key) based on the IK and the CK acquired by said acquirer and the IMSI of said UE in a first message;

a second generator that generates an MSK (Master Session Key), an EMSK (Extended Master Session Key), K_encr, and K_aut based on the MK generated by said first generator;

a third generator that generates a MAC (Message Authentication Code) based on the K_aut generated by said second generator; and a third communicator that transmits a second message including the MAC generated by said third generator, the RAND and the AUTN acquired by said acquirer, and the CK and the IK generated by said first generator as the concealment key.

8. An authentication apparatus of a system that authenticates UE, wherein the authentication apparatus acquires a concealment key corresponding to said UE from an HLR (Home Location Register) during authentication of said UE and transmits a message including the acquired concealment key to a femtocell base station, wherein said concealment key is used to conceal the identity of said UE just for communication between said UE and said femtocell base station, wherein a controller of the system comprises:

an acquirer that acquires a RAND (Random challenge), an AUTN (Authentication Token), an XRES (Expected RESponse), an IK (Integrity Key), and a CK (Cipher Key) corresponding to an IMSI of said UE from said HLR as the concealment key;

a first generator that generates an MK (Master Key) based on the IK and the CK acquired by said acquirer and the IMSI of said UE in a first message;

a second generator that generates an MSK (Master Session Key), an EMSK (Extended Master Session Key), K_encr, and K_aut based on the MK generated by said first generator;

a third generator that generates a MAC (Message Authentication Code) based on the K_aut generated by said second generator; and a third communicator that transmits a second message including the MAC generated by said third generator, the RAND and the AUTN acquired by said acquirer, and the CK and the IK generated by said first generator as the concealment key.

9. A communication method by a communication system comprising: UE (User Equipment) and an HLR (Home Location Register) used in an IMS (IP Multimedia subsystem) network; and a femtocell base station that constructs a predetermined communication area, the femtocell base station existing between said UE and said HLR, wherein said femtocell base station acquires a concealment key corresponding to said UE from said HLR during authentication of said UE and executes a concealment process to conceal the identity of said UE based on the concealment key, wherein said concealment key is used to conceal the identity of said UE just for communication between said UE and said femtocell base station, wherein a controller of the system comprises:

an acquirer that acquires a RAND (Random challenge), an AUTN (Authentication Token), an XRES (Expected RESponse), an IK (Integrity Key), and a CK (Cipher Key) corresponding to an IMSI of said UE from said HLR as the concealment key;

a first generator that generates an MK (Master Key) based on the IK and the CK acquired by said acquirer and the IMSI of said UE in a first message;

a second generator that generates an MSK (Master Session Key), an EMSK (Extended Master Session Key), K_encr, and K_aut based on the MK generated by said first generator;

a third generator that generates a MAC (Message Authentication Code) based on the K_aut generated by said second generator; and a third communicator that transmits a second message including the MAC generated by said third generator, the RAND and the AUTN acquired by said acquirer, and the CK and the IK generated by said first generator as the concealment key.

10. A communication method by a femtocell base station of a system that constructs a predetermined communication area, wherein a concealment key corresponding to UE is acquired from an HLR during authentication of said UE, and a concealment process for concealing the identity of said UE is executed based on the concealment key, wherein said concealment key is used to conceal the identity of said UE just for communication between said UE and said femtocell base station, wherein a controller of the system comprises:

an acquirer that acquires a RAND (Random challenge), an AUTN (Authentication Token), an XRES (Expected RESponse), an IK (Integrity Key), and a CK (Cipher Key) corresponding to an IMSI of said UE from said HLR as the concealment key;

a first generator that generates an MK (Master Key) based on the IK and the CK acquired by said acquirer and the IMSI of said UE in a first message;

a second generator that generates an MSK (Master Session Key), an EMSK (Extended Master Session Key), K_encr, and K_aut based on the MK generated by said first generator;

a third generator that generates a MAC (Message Authentication Code) based on the K_aut generated by said second generator; and a third communicator that transmits a second message including the MAC generated by said third generator, the RAND and the AUTN acquired by said acquirer, and the CK and the IK generated by said first generator as the concealment key.

11. A communication method by an authentication apparatus of a system that authenticates UE, wherein a concealment key corresponding to said UE is acquired from an HLR (Home Location Register) during authentication of said UE, and a message including the acquired concealment key is transmitted to a femtocell base station, wherein said concealment key is used to conceal the identity of said UE just for communication between said UE and said femtocell base station, wherein a controller of the system comprises:

an acquirer that acquires a RAND (Random challenge), an AUTN (Authentication Token), an XRES (Expected RESponse), an IK (Integrity Key), and a CK (Cipher Key) corresponding to an IMSI of said UE from said HLR as the concealment key;

a first generator that generates an MK (Master Key) based on the IK and the CK acquired by said acquirer and the IMSI of said UE in a first message;

a second generator that generates an MSK (Master Session Key), an EMSK (Extended Master Session Key), K_encr, and K_aut based on the MK generated by said first generator;

a third generator that generates a MAC (Message Authentication Code) based on the K_aut generated by said second generator; and a third communicator that transmits a second message including the MAC generated by said third generator, the RAND and the AUTN acquired by said acquirer, and the CK and the IK generated by said first generator as the concealment key.

12. A non-transitory computer-readable recording medium recording a program for the computer of a system to acquire a concealment key corresponding to UE from an HLR during authentication of said UE and execute a concealment process to conceal the identity of said UE based on the concealment key, wherein said concealment key is used to conceal the identity of said UE just for communication between said UE and said femtocell base station, wherein a controller of the system comprises:

an acquirer that acquires a RAND (Random challenge), an AUTN (Authentication Token), an XRES (Expected RESponse), an IK (Integrity Key), and a CK (Cipher Key) corresponding to an IMSI of said UE from said HLR as the concealment key;

a first generator that generates an MK (Master Key) based on the IK and the CK acquired by said acquirer and the IMSI of said UE in a first message;

a second generator that generates an MSK (Master Session Key), an EMSK (Extended Master Session Key), K_encr, and K_aut based on the MK generated by said first generator;

a third generator that generates a MAC (Message Authentication Code) based on the K_aut generated by said second generator; and a third communicator that transmits a second message including the MAC generated by said third generator, the RAND and the AUTN acquired by said acquirer, and the CK and the IK generated by said first generator as the concealment key.

13. A non-transitory computer-readable recording medium recording a program for the computer of a system to acquire a concealment key corresponding to said UE during authentication of said UE from an HLR (Home Location Register) and execute a process of transmitting a message including the acquired concealment key to a femtocell base station, wherein said concealment key is used to conceal the identity of said UE just for communication between said UE and said femtocell base station, wherein a controller of the system comprises:

an acquirer that acquires a RAND (Random challenge), an AUTN (Authentication Token), an XRES (Expected RESponse), an IK (Integrity Key), and a CK (Cipher Key) corresponding to an IMSI of said UE from said HLR as the concealment key;

a first generator that generates an MK (Master Key) based on the IK and the CK acquired by said acquirer and the IMSI of said UE in a first message;

a second generator that generates an MSK (Master Session Key), an EMSK (Extended Master Session Key), K_encr, and K_aut based on the MK generated by said first generator;

a third generator that generates a MAC (Message Authentication Code) based on the K_aut generated by said second generator; and a third communicator that transmits a second message including the MAC generated by said third generator, the RAND and the AUTN acquired by said acquirer, and the CK and the IK generated by said first generator as the concealment key.

* * * * *